US008155865B2

(12) United States Patent
Bicego, Jr.

(10) Patent No.: US 8,155,865 B2
(45) Date of Patent: Apr. 10, 2012

(54) METHOD AND SYSTEM FOR AUTOMATICALLY UPDATING TRAFFIC INCIDENT DATA FOR IN-VEHICLE NAVIGATION

(75) Inventor: James Bicego, Jr., Utica, MI (US)

(73) Assignee: General Motors LLC, Detroit, MI (US)

( * ) Notice: Subject to any disclaimer, the term of this patent is extended or adjusted under 35 U.S.C. 154(b) by 722 days.

(21) Appl. No.: 12/059,647

(22) Filed: Mar. 31, 2008

(65) Prior Publication Data
US 2009/0248283 A1 Oct. 1, 2009

(51) Int. Cl.
*G08G 1/00* (2006.01)
(52) U.S. Cl. ............... 701/117; 701/1; 701/36; 701/118; 340/539.13; 340/988; 340/989; 455/456.6; 455/461
(58) Field of Classification Search .................. None
See application file for complete search history.

(56) References Cited

U.S. PATENT DOCUMENTS

| | | | | | |
|---|---|---|---|---|---|
| 6,166,627 | A | * | 12/2000 | Reeley | 340/426.25 |
| 6,650,252 | B2 | * | 11/2003 | Miller, Jr. | 340/989 |
| 7,271,716 | B2 | * | 9/2007 | Nou | 340/539.13 |
| 7,421,334 | B2 | * | 9/2008 | Dahlgren et al. | 701/117 |
| 7,859,392 | B2 | * | 12/2010 | McClellan et al. | 340/441 |
| 7,917,253 | B2 | * | 3/2011 | Inbarajan et al. | 701/1 |
| 2003/0139909 | A1 | * | 7/2003 | Ozawa | 702/183 |
| 2003/0210129 | A1 | * | 11/2003 | Aslund et al. | 340/5.31 |
| 2005/0030224 | A1 | * | 2/2005 | Koch | 342/357.07 |
| 2005/0065711 | A1 | * | 3/2005 | Dahlgren et al. | 701/117 |
| 2005/0075095 | A1 | * | 4/2005 | Dillon | 455/412.2 |
| 2005/0192033 | A1 | * | 9/2005 | Videtich | 455/456.6 |
| 2005/0278082 | A1 | * | 12/2005 | Weekes | 701/1 |
| 2006/0033615 | A1 | * | 2/2006 | Nou | 340/539.13 |
| 2006/0103674 | A1 | * | 5/2006 | Horvitz et al. | 345/629 |
| 2006/0166656 | A1 | * | 7/2006 | Klicpera et al. | 455/414.3 |
| 2007/0026876 | A1 | * | 2/2007 | Freilich | 455/461 |
| 2007/0285512 | A1 | * | 12/2007 | Kitani et al. | 348/148 |
| 2008/0077310 | A1 | * | 3/2008 | Murlidar et al. | 701/117 |
| 2008/0119983 | A1 | * | 5/2008 | Inbarajan et al. | 701/36 |
| 2008/0140287 | A1 | * | 6/2008 | Yang et al. | 701/45 |
| 2009/0034630 | A1 | * | 2/2009 | Cho et al. | 375/240.27 |
| 2009/0176512 | A1 | * | 7/2009 | Morrison | 455/456.6 |

* cited by examiner

*Primary Examiner* — Khoi Tran
*Assistant Examiner* — Jonathan L Sample
(74) *Attorney, Agent, or Firm* — Leydig, Voit & Mayer, Ltd.

(57) ABSTRACT

Aspects of the invention disclose a method and system for automatically updating traffic incident data for in-vehicle navigation. This includes, but is not limited to, a method and system of notifying one or more traffic providers of a traffic accident when a telematics provider receives an automated accident notification from a vehicle. The notification prompts the traffic provider to investigate the traffic accident immediately using manual techniques (monitoring police scanners, visual confirmation by aircraft, etc.) and accurately updates its traffic information in a more timely manner. In turn, the traffic information received by the telematics unit from traffic provider is more accurate. This allows the telematics unit navigation system to provide accurate navigation directions to the subscriber while driving through traffic congested areas.

19 Claims, 4 Drawing Sheets

METHOD AND SYSTEM FOR AUTOMATICALLY UPDATING TRAFFIC INCIDENT DATA FOR IN-VEHICLE NAVIGATION

FIELD OF THE INVENTION

Telematics technology provides a wide array of functions that includes navigation, entertainment, and information services. The present application generally describes technologies applicable to utilizing GPS location information of telematics equipped vehicles by a telematics provider. In particular, the present application discloses a method and system for automatically updating incident data for in-vehicle navigation.

BACKGROUND OF THE INVENTION

To enable commuters and other drivers to better plan their travel routes and schedules, it is known to provide traffic information and updates, e.g., via a broadcast. Traffic information providers typically monitor the conditions of roads and highways using manual techniques. For instance, they may monitor police scanners for traffic accidents, solicit information from regional transportation departments, and make visual observations and confirmations from the air, e.g., via a helicopter or other aircraft. However, these manual techniques do not provide reliable, up to date traffic information. Thus, when such traffic information providers supply this information to consumers, the information is not as useful or reliable as it should be to provide optimal guidance.

BRIEF SUMMARY OF THE INVENTION

Aspects of the invention disclose a method and system for automatically updating traffic incident data for in-vehicle navigation. This includes, but is not limited to, a method and system of notifying one or more traffic providers of a traffic accident when a telematics provider receives an automated accident notification from a vehicle. The notification prompts the traffic provider to investigate the traffic accident immediately using manual techniques (monitoring police scanners, visual confirmation by aircraft, etc.) and accurately updates its traffic information in a more timely manner. In turn, the traffic information received by the telematics unit from traffic provider is more accurate. This allows the telematics unit navigation system to provide accurate navigation directions to the subscriber while driving through traffic congested areas.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
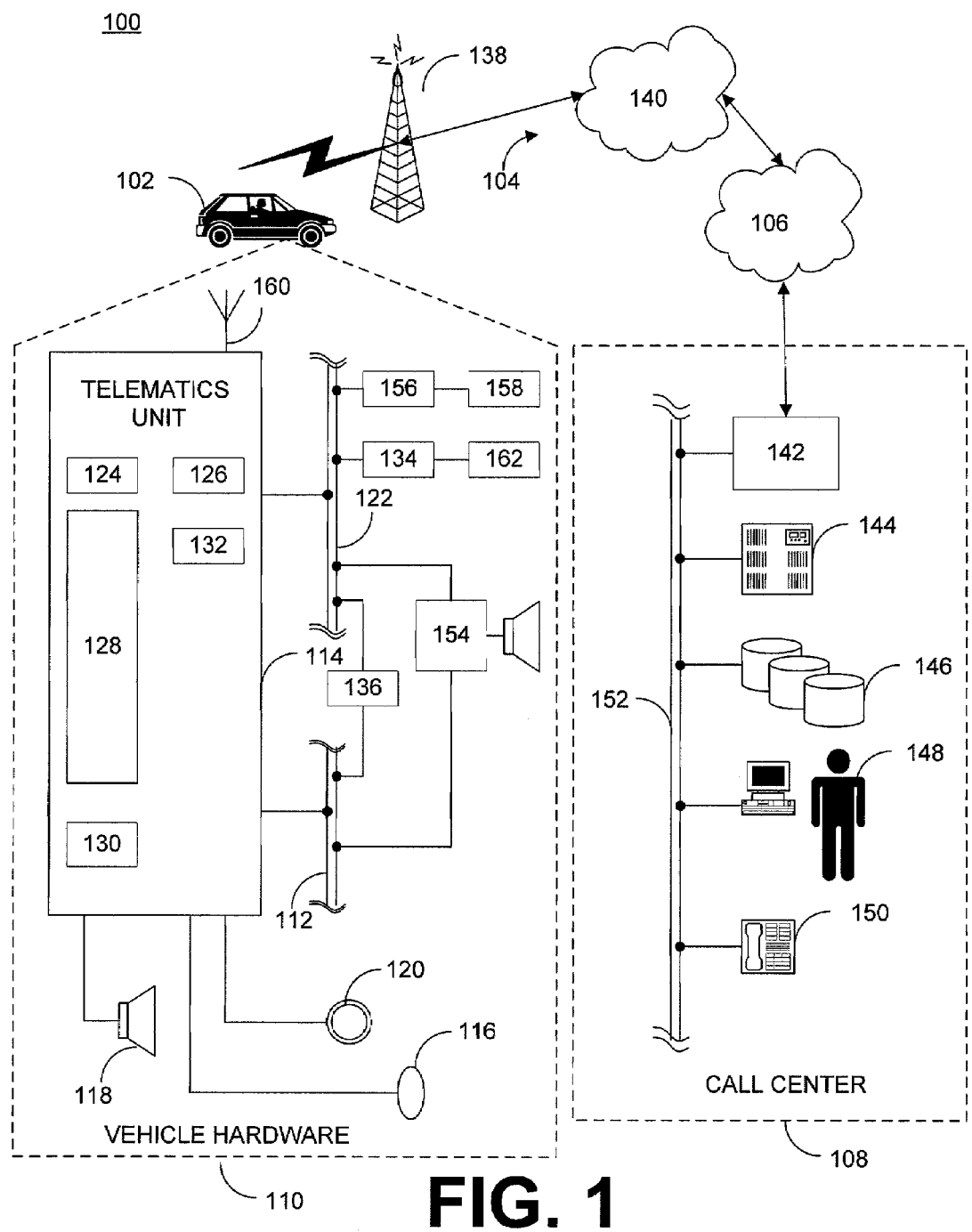
FIG. 1 is a schematic view of an example communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Aspects of the invention disclose a method and system for automatically updating traffic incident data for in-vehicle navigation. This includes, but is not limited to, a method and system of notifying one or more traffic providers of a traffic accident when a telematics provider receives an automated accident notification from a vehicle. The notification prompts the traffic provider to investigate the traffic accident immediately using its manual technique (monitoring police scanners, visual confirmation by aircraft, etc.) and accurately updates its traffic information in a more timely manner. In turn, the traffic information received by the telematics unit from traffic provider is more accurate. This allows the telematics unit navigation system to provide accurate navigation directions to the subscriber while driving through traffic congested areas.

Figure 2:
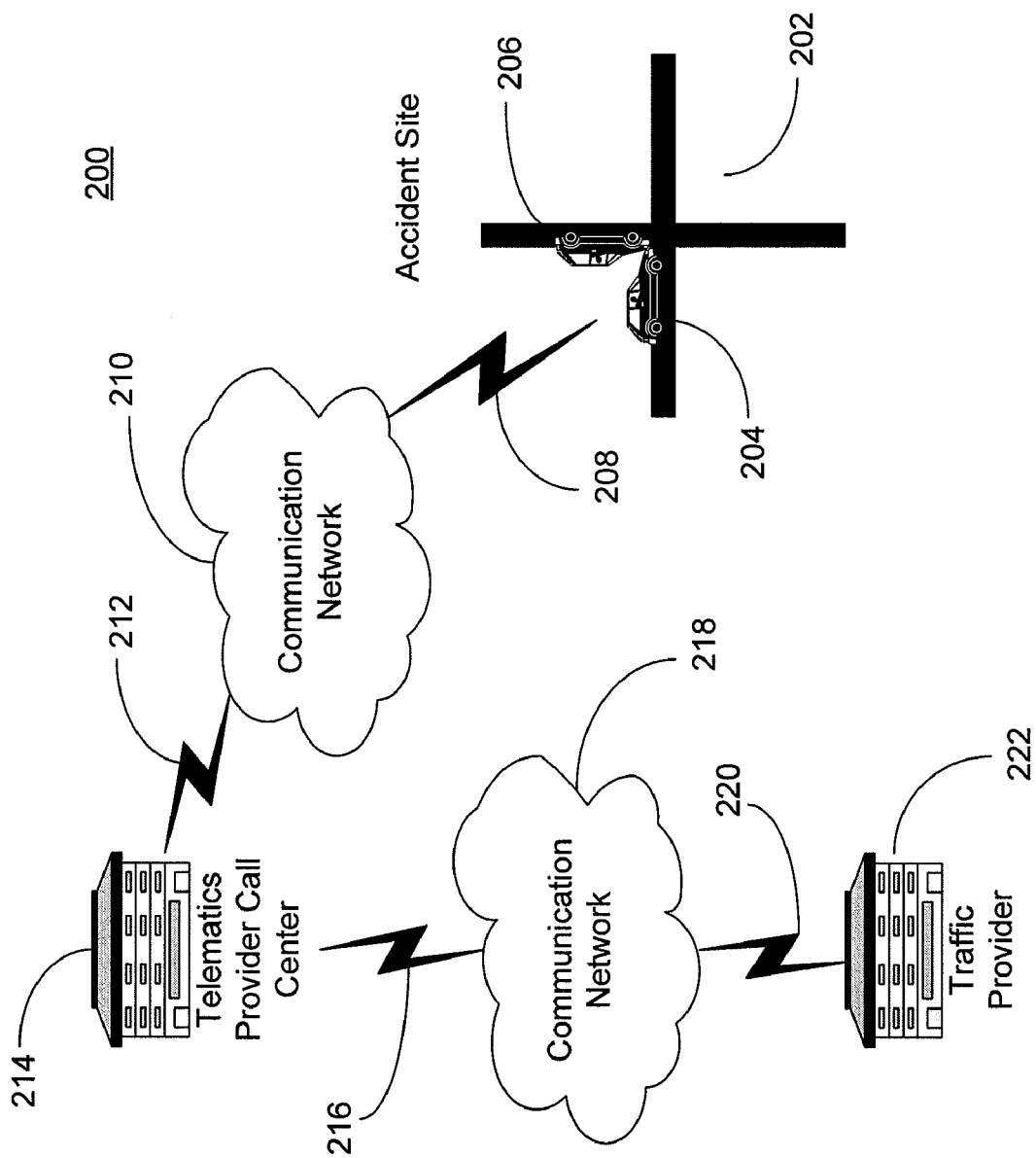
FIG. 2 is a schematic view of an exemplary system architecture in keeping with the disclosed principles.

FIG. 2 is a schematic view of an exemplary system architecture 200 in keeping with the disclosed principles. FIG. 2 shows an illustrative accident site 202 wherein two vehicles (204, 206) have collided into one another. In this example, at least one vehicle 204 contains a telematics unit. When the vehicle 204 is involved in the accident and/or when the airbag is deployed, an accident notification is sent from the telematics equipped vehicle 204 to a telematics provider call center 214 across a communications network 210 and communication links (208, 212). A call advisor receiving the accident notification may assist the driver/subscriber of the vehicle 204 by directing emergency personnel to the accident site 202, but may also, for example, send a notification of the accident to a traffic provider 222. The notification can include a description of the location 202 and may also include a description related to the severity of the accident with respect to its effect on traffic flow.

The call advisor may use an electronic device such as a computer, personal digital assistant or other device to receive the accident notification from the vehicle 204. The call advisor receives the GPS location of the telematics equipped vehicle with the accident notification. The call advisor then forwards the GPS location information to a traffic provider 222 to investigate, confirm, and update its traffic reports. The traffic accident notification may be transmitted across a communication network 218 and communication links (218, 220) to the traffic provider using an electronic device such as a as a computer, personal digital assistant or other device. Note that the telematics provider may notify the traffic provider through any number of forms of communication that include, but are not limited to, telephone communications, e-mail, instant messaging, text messaging, and image messaging.

Figure 3:
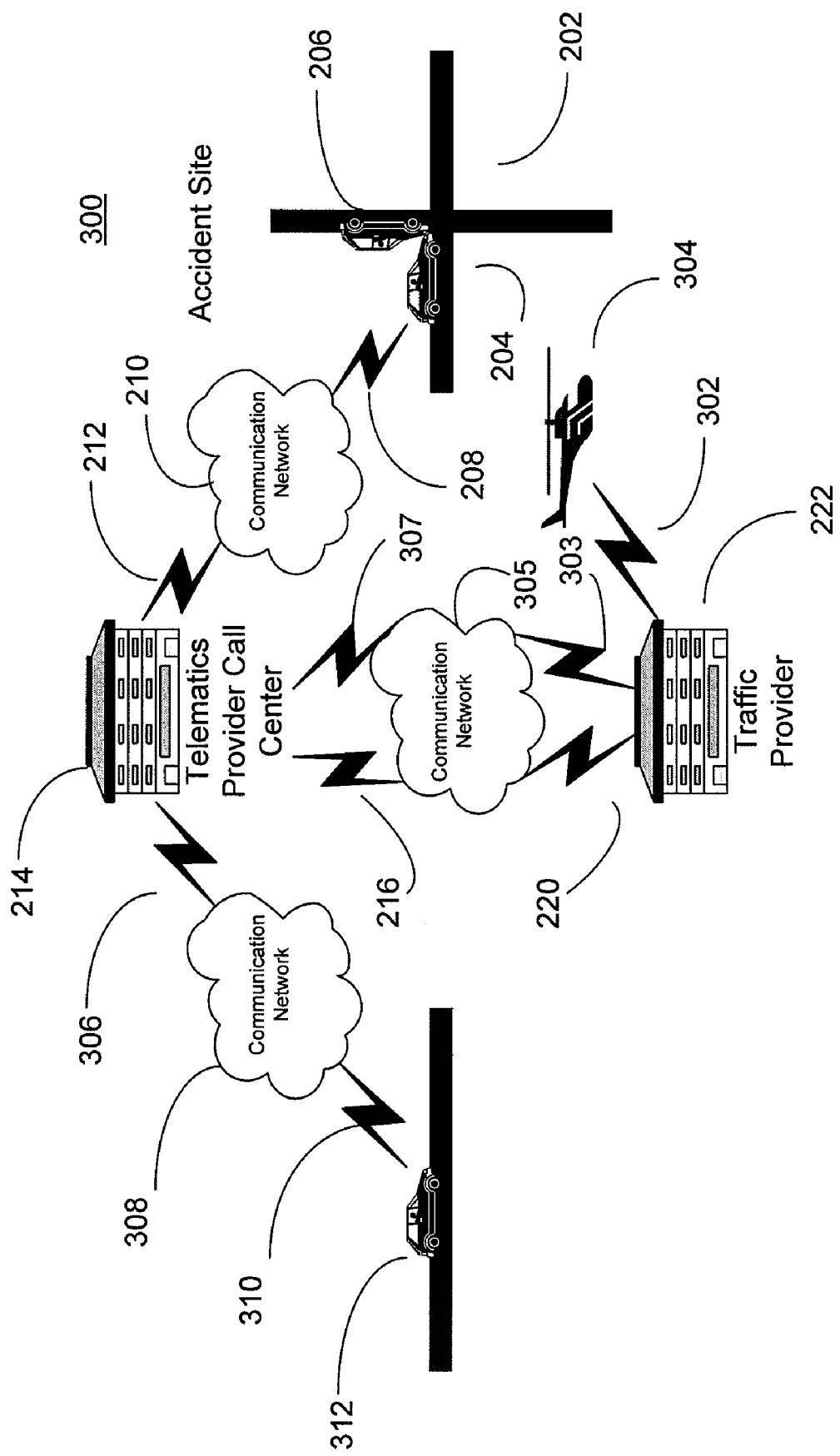
FIG. 3 is another schematic view of and exemplary system architecture in keeping with the disclosed principles.

FIG. 3 shows a schematic view of an exemplary system architecture 300 in keeping with the disclosed principles. Some of aspects depicted in FIG. 3 are common to FIG. 2. FIG. 3 further depicts an aspect of the invention such that after receiving a notification from the telematics provider 214, the traffic provider 222 dispatches an aircraft 304 by sending aircraft personnel a notification of the accident site across a communication link 302 to confirm the accident notification received by the telematics provider. Aircraft personnel confirm the traffic accident when reaching the accident site and send a confirmation to the traffic provider 222 across a communication link 302. The traffic provider may then update its traffic report. The traffic provider 222 periodically sends the telematics provider 214 traffic reports across a communication network 305 and communication links (303, 307) for use in the telematics provider's 214 telematics unit navigation systems.

Upon receiving an updated traffic report (through an electronic device such as a computer, personal digital assistant or some other device), the telematics service provider 214 updates the navigation instructions and transmits the updated instructions, as well as, in one example, the traffic report information, to one or more telematics unit navigation systems installed in subscriber vehicles 312 across a communication network 308 and communication links (306, 310). The navigation system provides the subscriber with driving instructions to avoid the traffic incidents contained in the updated traffic report.

Figure 4:
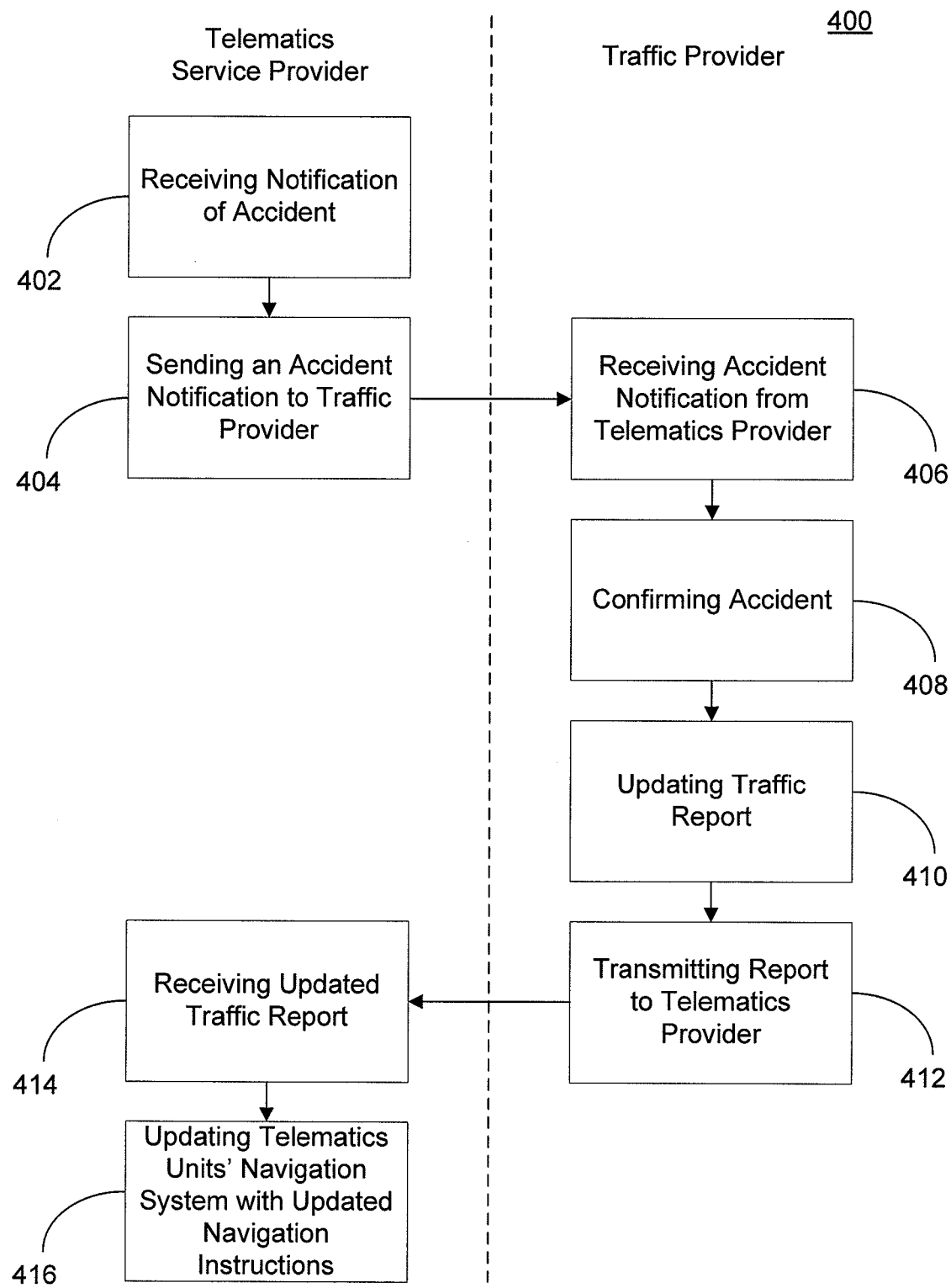
FIG. 4 is a flow diagram that illustrates an exemplary aspect of a method of automatically updating traffic incident information for in-vehicle navigation according to an aspect of the invention.

FIG. 4 is a flow diagram that illustrates an exemplary implementation of a method of automatically updating traffic incident information for in-vehicle navigation in accordance with the disclosed principles. At step 402, a telematics provider receives an accident notification from a telematics unit equipped vehicle involved in a traffic accident and records a GPS location of the reporting vehicle. At step 404, the telematics provider sends the traffic incident notification, including the reporting vehicle's GPS coordinates, to a traffic provider. The traffic provider receives the traffic incident notification from the telematics provider at step 406. At step 408, the traffic provider confirms the accident using manual techniques such as dispatching aircraft to the scene of the accident or monitoring police scanners. At step 410, the traffic provider updates its traffic report. At step 412, the traffic provider transmits the updated traffic report to the telematics provider. Subsequently at step 414, the telematics provider receives an updated traffic report, including a confirmed accident location. Finally, at step 416, the telematics provider updates one or more telematics units' navigation systems with the updated navigation instructions and, in one example, an updated traffic report, to provide driving directions that allow subscribers to avoid, or plan in mind of, recent traffic incidents. In one example, the route segments where the accident occurred are noted and used by the telematics provider in future route calculations for vehicles that may potentially traverse the affected segments, thereby increasing the accuracy of server-based routing. When telematics subscribers request navigational routes, the telematics provider considers the updated traffic report/information and excludes the road data segments affected by the accident from newly generated routes.

It will be appreciated that a new method and system for automatically updating incident data for in-vehicle navigation has been disclosed herein. This system is widely applicable to improve traffic information and subscriber travel convenience. In view of the breadth of this disclosure, it will be appreciated that all references, including publications, patent applications, and patents, cited herein are hereby incorporated by reference to the same extent as if each reference were individually and specifically indicated to be incorporated by reference and were set forth in its entirety herein. Moreover, the use of terms such as "a", "an" and "the", and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred implementations of this invention are described herein, including the best mode known to the inventors for carrying out the invention. Variations of those preferred implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for automatically updating traffic incident data for use by an in-vehicle navigation system within a telematics unit associated with a vehicle, the system comprising:

a telematics unit for transmitting a first accident notification to a telematics provider's telematics data receiving unit responsive to an occurrence of a collision involving the vehicle; and the telematics data receiving unit associated with the telematics provider that receives the accident notification from the telematics unit wherein the telematics unit transmits the accident notification to a traffic information provider and in response said telematics provider receives an updated traffic report back from the traffic information provider.

2. The system for automatically updating traffic incident data according to claim 1, further comprising:

a traffic report receiving device whereby the traffic information provider receives a second accident notification from the telematics provider.

3. The, system for automatically updating traffic incident data according to claim 1, further comprising:

a second telematics receiving unit whereby the telematics provider receives traffic report information from the traffic information provider; and a second traffic update reporting device that transmits the traffic report information to one or more telematics units;

a first communication network that transmits the traffic report information to the one or more telematics units; and at least one telematics unit that receives the traffic report information from the second traffic update reporting device wherein the at least one telematics unit uses the traffic report information within the in-vehicle navigation system to provide navigation instructions to the vehicle driver.

4. The system for automatically updating traffic incident data according to claim 1, wherein the accident notification contains GPS information of the telematics equipped vehicle that sent the accident notification.

5. The system for automatically updating traffic incident data according to claim 2, wherein the second accident notification contains GPS information of the telematics equipped vehicle that sent the second accident notification.

6. The system for automatically updating traffic incident data according to claim 2, wherein the second accident notification is a message selected from the group consisting of a telephone communication, an e-mail, an instant message, a text message, and an image message.

7. The system for automatically updating traffic incident data according to claim 1, wherein the accident notification is sent via a communication network selected from the group consisting of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, and a WiMAX network.

8. The system for automatically updating traffic incident data according to claim 1, wherein the accident notification is sent from the telematics provider to the traffic information provider via a communication network selected from the group consisting of a wireless wide area network, a wireless metropolitan area network, a wireless local area network, a CDMA2000, an Evolution Data Optimized (EVDO), a High Speed Downlink Packet Access (HSDPA), a GSM, a WiFi, a WiMAX network, the Internet, a local area network, a wide area network, a computer network, a voice over IP network, and a public switched telephone network.

9. A method for automatically updating traffic incident data for an in-vehicle navigation system within a telematics unit associated with a vehicle, the system comprising:

receiving at a telematics provider an accident notification from a telematics unit installed in a vehicle that is involved in a traffic incident across a first communication network;

transmitting the accident notification from the telematics provider to a traffic information provider across a second communication network, whereupon the traffic information provider prepares an updated traffic report reflecting the incident and returns the updated traffic report via the second communication network to the telematics provider.

10. The method for automatically updating traffic incident data according to claim 9, further comprising:

transmitting the updated traffic report data from the telematics provider across the first communication network to the telematics unit installed in the vehicle wherein the telematics unit uses the traffic report data within the in-vehicle navigation system to provide navigation instructions to the vehicle driver.

11. The method for automatically updating traffic incident data according to claim 9, wherein the first accident notification contains GPS information of the telematics equipped vehicle that sent the accident notification.

12. The method for automatically updating traffic incident data according to claim 9 wherein the accident notification is a message selected from the group consisting of a telephone communication, an e-mail, an instant message, a text message, and an image message.

13. The method for automatically updating traffic incident data according to claim 9, wherein the first communication network is selected from the group consisting of a wireless wide area network, a wireless metropolitan an area network, a wireless local area network, a CDMA2000 network, an Evolution Data Optimized (EVDO) network, a High Speed Downlink Packet Access (HSDPA) network, a GSM network, a WiFi network, and a WiMAX network.

14. The method for automatically updating traffic incident data according to claim 9, wherein the second communication network is selected from the group consisting of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, a WiMAX network, the Internet, a local area network, a wide area network, a computer network, a voice over IP network, and a public switched telephone network.

15. A method for automatically updating traffic incident data for in-vehicle navigation system within a telematics unit, the system comprising:

receiving an accident notification from a telematics service provider across a communication network, the accident notification identifying an accident occurring with respect to a vehicle;

confirming the accident identified in the accident notification using a manual technique;

updating a traffic report based on the confirmation of the accident received in the accident notification; and transmitting the traffic report to the telematics provider for retransmission to a telematics unit of a vehicle.

16. The method for automatically updating traffic incident data according to claim 15, wherein the accident notification contains GPS information of the location of the vehicle involved in the accident.

17. The method for automatically updating traffic incident data according to claim 15, wherein the communication network is selected from the group consisting of a wireless wide area network, a wireless metropolitan area network, a wireless local area network, a CDMA2000 network, an Evolution Data Optimized (EVDO) network, a High Speed Downlink Packet Access (HSDPA) network, a GSM network, a WiFi network, a WiMAX network, the Internet, a local area network, a wide area network, a computer network, a voice over IP network, and a public switched telephone network.

18. The method for automatically updating traffic incident data according to claim 15, wherein the manual technique used to confirm the accident notification is selected from the group of monitoring at least one police scanner, visual confirmation using an aircraft and an aircraft personnel, and soliciting information from a regional transportation department.

19. The method for automatically updating traffic incident data according to claim 15, wherein the accident notification is a message selected from the group consisting of a telephone communication, an e-mail, an instant message, a text message, and an image message.

* * * * *